(12) United States Patent
Hong et al.

(10) Patent No.: US 10,824,155 B2
(45) Date of Patent: Nov. 3, 2020

(54) PREDICTING MOVEMENT INTENT OF OBJECTS

(71) Applicant: Ford Global Technologies, LLC, Dearborn, MI (US)

(72) Inventors: Sanghyun Hong, Ann Arbor, MI (US); Justin Miller, Royal Oak, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 16/109,509

(22) Filed: Aug. 22, 2018

(65) Prior Publication Data

US 2020/0064850 A1 Feb. 27, 2020

(51) Int. Cl.
*G05D 1/02* (2020.01)
*B60W 30/09* (2012.01)
(Continued)

(52) U.S. Cl.
CPC ........... *G05D 1/0214* (2013.01); *B60W 30/09* (2013.01); *B60W 30/0956* (2013.01); *G05D 1/0088* (2013.01); *G08G 1/162* (2013.01); *B60W 2510/0604* (2013.01); *B60W 2510/182* (2013.01); *B60W 2520/06* (2013.01); *B60W 2520/12* (2013.01); *B60W 2520/14* (2013.01); *B60W 2520/26* (2013.01); *B60W 2530/10* (2013.01); *B60W 2540/18* (2013.01);
(Continued)

(58) Field of Classification Search
CPC ............... G05D 1/0214; G05D 1/0088; G05D 2201/0213; B60W 30/0956; B60W 2540/30; B60W 2550/308
See application file for complete search history.

(56) References Cited

U.S. PATENT DOCUMENTS 9,511,767 B1 12/2016 Okumura et al.
9,604,639 B2 3/2017 Laur et al.
(Continued)

FOREIGN PATENT DOCUMENTS

DE 102016001772 A1 8/2016
WO 2017/044525 A1 3/2017

*Primary Examiner* — Rami Khatib
(74) *Attorney, Agent, or Firm* — Brandon Hicks; Eversheds Sutherland (US) LLP

(57) ABSTRACT

The present disclosure extends to methods, systems, and computer program products for predicting the movement intent of objects. In one aspect, a mobile robot predicts the movement intent of pedestrians from past pedestrian trajectory data and landmark proximity. In another aspect, a host mobile robot predicts the movement intent of other robots/vehicles using motion analysis models for different driving behaviors, including curve negotiation, zigzagging, rapid acceleration/deceleration, and tailgating. In a further aspect, a mobile robot can self-predict movement intent and share movement intent information with surrounding robots/vehicles (e.g., through vehicle-to-vehicle (V2V) communication). The mobile robot can self-predict future movement by comparing the operating values calculated from the monitored components to the operating limits of the mobile robot (e.g., an adhesion limit between the tires and ground). Exceeding operating limits can be an indication of skidding, oversteering, understeering, or fishtailing.

10 Claims, 10 Drawing Sheets

(51) Int. Cl.
*B60W 30/095* (2012.01)
*G09G 1/16* (2006.01)
*G05D 1/00* (2006.01)
*G08G 1/16* (2006.01)

(52) U.S. Cl.
CPC ..... *B60W 2540/30* (2013.01); *B60W 2552/40* (2020.02); *B60W 2554/801* (2020.02); *G05D 2201/0213* (2013.01)

(56) References Cited

U.S. PATENT DOCUMENTS

| | | |
|---|---|---|
| 9,731,713 B2 | 8/2017 | Horii |
| 9,764,736 B2 | 9/2017 | Prokhorov |
| 9,771,070 B2 | 9/2017 | Zagorski et al. |
| 2011/0313664 A1* | 12/2011 | Sakai .................. B60W 30/08 701/301 |
| 2012/0062743 A1* | 3/2012 | Lynam .................. B60Q 9/005 348/148 |
| 2014/0330479 A1* | 11/2014 | Dolgov ................ B60W 30/16 701/28 |
| 2015/0151725 A1* | 6/2015 | Clarke .................. B60W 40/06 701/28 |
| 2017/0129434 A1* | 5/2017 | Sun ....................... B60R 21/013 |
| 2017/0183007 A1* | 6/2017 | Oh ........................ B60W 30/16 |
| 2017/0270373 A1* | 9/2017 | Kawasaki ............... B60R 21/00 |
| 2018/0040171 A1* | 2/2018 | Kundu ................... G07C 5/008 |
| 2019/0001973 A1* | 1/2019 | Matsunaga ........... G08G 1/166 |
| 2019/0025853 A1* | 1/2019 | Julian ................... G06K 9/3233 |
| 2019/0071072 A1* | 3/2019 | Seo ...................... G05D 1/0223 |
| 2019/0111916 A1* | 4/2019 | Lee ...................... G05D 1/0088 |
| 2019/0135246 A1* | 5/2019 | Jeong .................... B60T 8/171 |

* cited by examiner $$R = \arg\min_{r, x_c, y_c} \quad \beta_1 \frac{1}{r} + \beta_2 \sum_{i=1}^{N} \|p_i - m_i\|_2 \quad \text{701A}$$

$$\text{subj. to} \quad p_i = (x_i, y_i) = (x_i, \sqrt{r^2 - (x_i - x_c)^2} + y_c) \quad \text{701B}$$

$$r \geq 0,$$

$$\bar{a}_y = \frac{\bar{v}_x^2}{R} = \bar{v}_x^2 \rho \quad \text{702}$$

$$ADI_{a_{y\_i}} = \frac{|a_{y\_i}|}{\bar{a}_y} \times 100 \quad \text{703}$$

$$R_i = \left| \frac{v_{x\_i}}{\dot{\psi}_i} \right| \quad \text{704}$$

FIG. 7

$$d_{err\_i} = d_i - d_m \quad \text{801}$$

$$ADI_{d_{err\_i}} = \frac{S_k^+}{\bar{S}} \times 100 \quad \text{802}$$

$$\bar{S} = f(v_{x\_i}, \mu, \text{parameters}(\text{vehicle } i), \text{traffic density}) \quad \text{803}$$

FIG. 8

$$x = [d_{rel\_i}, \dot{d}_{rel\_i}]^T \quad 901$$

$$\dot{x} = \begin{bmatrix} 0 & 1 \\ 0 & 0 \end{bmatrix} x + \begin{bmatrix} 0 \\ 1 \end{bmatrix} \bar{a}_{rel\_i} \quad 902$$

$$d_{des\_i} = \tau v_{x\_i} + c, \quad 903$$

$$\bar{a}_{rel\_i} = -Kx + N d_{des\_i} \quad 904$$

$$ADI_{a_{x,rel\_i}} = \left( \frac{|a_{x,rel\_i}|}{|\bar{a}_{rel\_i}|} - 1 \right) \times 100 \quad 905$$

FIG. 9

$$d_{err\_i} = d_{des\_i} - d_{rel\_i} \quad 1001$$

$$ADI_{d_{des}} = \frac{S_k^+}{\bar{S}} \times 100 \quad 1002$$

FIG. 10

PEDESTRIAN DETECTION
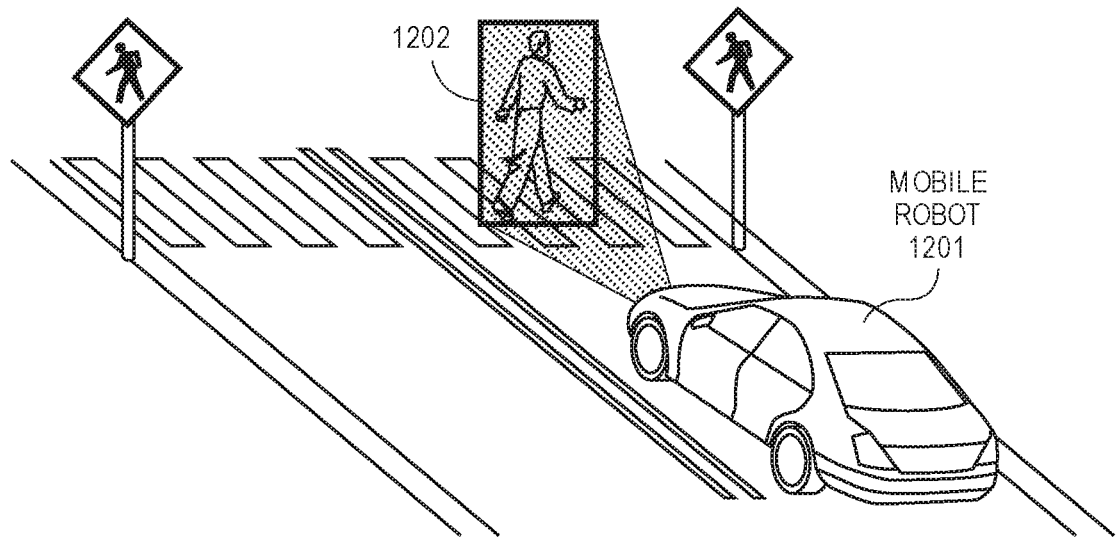
DETECTION WITH CAMERA
FIG. 12A
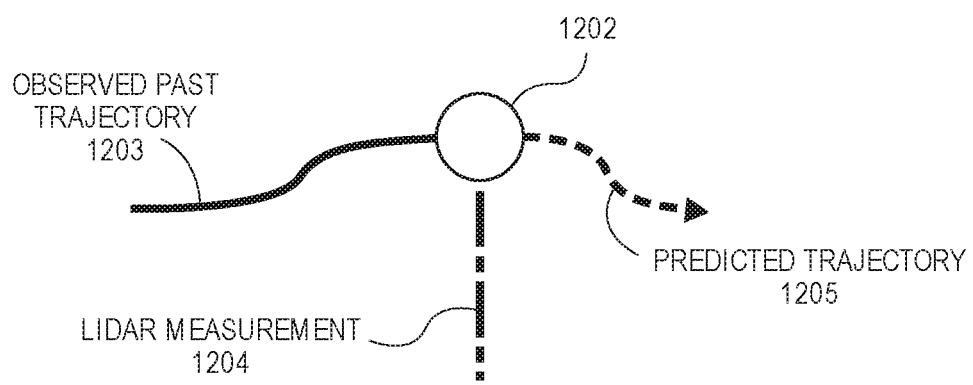
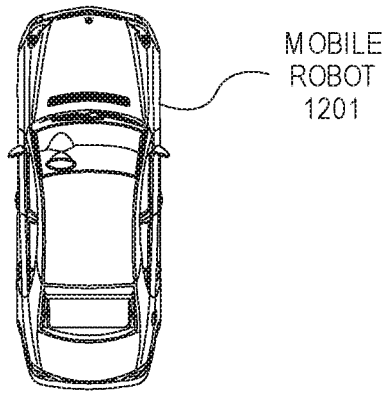
TRACKING WITH LIDAR
FIG. 12B

PREDICTING MOVEMENT INTENT OF OBJECTS

FIELD

This disclosure relates generally to the field of mobile robots and, more particularly, to predicting the movement intent of mobile robots and other objects around mobile robots.

BACKGROUND

When mobile robots, such as autonomous vehicles and personal mobility devices, navigate to a destination, the mobile robots can attempt to predict the movement intent of their surroundings, including pedestrians and other robots/vehicles. However, with limited information of surroundings, it can be difficult for mobile robots to consistently predict movement intent. When mobile robots fail to appropriately predict movement intent, unsafe and/or dangerous situations can occur. For example, roadway accidents can occur when a mobile robot fails to predict movement intent of surrounding vehicles and pedestrians, such as misunderstanding a traffic signal and abruptly crossing through an intersection.

BRIEF DESCRIPTION OF THE DRAWINGS

The specific features, aspects and advantages of the present disclosure will become better understood with regard to the following description and accompanying drawings where:

FIG. 7 illustrates example equations for predicting the movement intent of a mobile robot negotiating a curve.

FIG. 8 illustrates example equations for predicting the movement intent of a mobile robot exhibiting zigzag behavior.

FIG. 9 illustrates example equations for predicting the movement intent of a mobile robot exhibiting harsh acceleration and harsh braking behavior.

FIG. 10 illustrates example equations for predicting the movement intent of a mobile robot exhibiting tailgating behavior.

FIGS. 12A and 12B illustrate an example of detecting and predicting the movement intent of a pedestrian.

DETAILED DESCRIPTION

Figure 1:
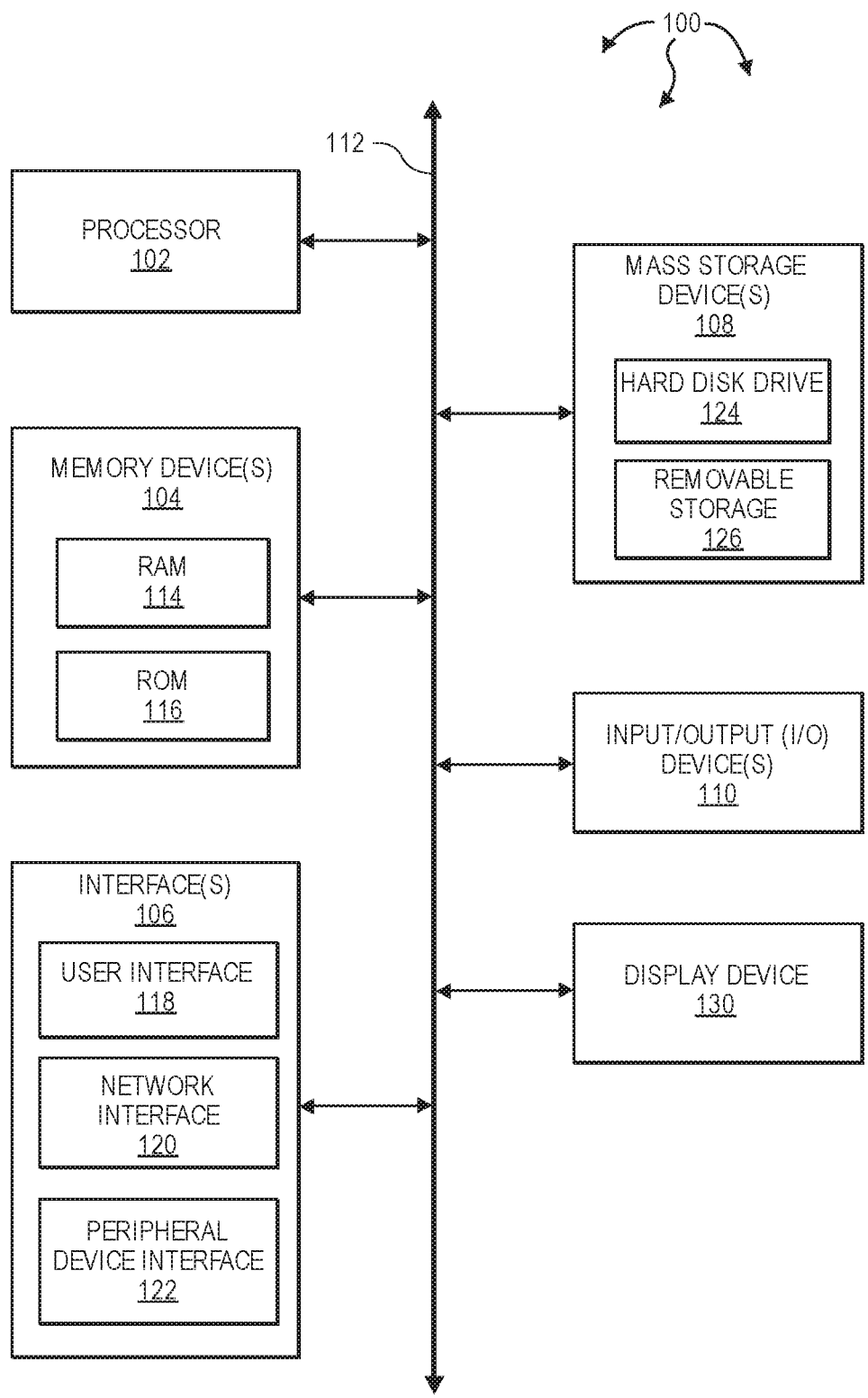
FIG. 1 illustrates an example block diagram of a computing device.

The present disclosure extends to methods, systems, and computer program products for predicting the movement intent of objects.

Aspects of the disclosure analyze the behavior of surrounding pedestrians and robots/vehicles to predict their movement intent. In one aspect, a mobile robot predicts the movement intent of pedestrians. At the mobile robot, sensors collect sensor data used to identify and track pedestrians. Computer vision algorithms are applied to identify bounding boxes for each pedestrian. Past pedestrian trajectory data and landmark proximity are used to predict the movement intent of pedestrians, such as, for example, when and where the pedestrians are likely to cross at traffic intersections.

In another aspect, a host mobile robot predicts the movement intent of other robots/vehicles. At the host mobile robot, sensors collect sensor data used to identify and track surrounding robots/vehicles. Motion analysis algorithms can use the sensor data to predict if another robot/vehicle is likely to move laterally (e.g., between lanes) into the path of the host mobile robot, for example, when the other robot/vehicle is navigating a curve or is zigzagging. Motion analysis algorithms can also use sensor data to predict if another robot/vehicle is likely to move longitudinally (e.g., in the same lane) into the path of the host mobile robot, for example, when the other robot/vehicle is accelerating/decelerating rapidly or tailgating.

In a further aspect, a mobile robot can self-predict movement intent and share movement intent information with surrounding robots/vehicles (e.g., through vehicle-to-vehicle (V2V) communication). Sensors at the mobile robot can monitor one or more aspects of the mobile robot's configuration, such as, for example, tire/wheel forces generated by tire slips, steering angles, braking pressure, throttle position, etc. The mobile robot can predict future movement by comparing operating values calculated from the monitored aspects to the operating limits of the mobile robot (e.g., an adhesion limit between tires and ground). Exceeding operating limits can be an indication of skidding, oversteering, understeering, fishtailing, etc. The mobile robot can communicate predicted future movements to surrounding robots/vehicles.

As such, a mobile robot can include a wide range of sensing devices. The sensing devices can take measurements used to predict movement intent. A mobile robot can include sensors for sensing an external environment around the mobile robot (e.g., radars, Lidars, laser scanners, cameras, etc.). A mobile robot can include sensors for sensing the motion of components at the mobile robot (e.g., inertial sensors, wheel speed sensors, suspension height sensors, steering wheel angle sensors, steering torque sensors, and brake pressure sensors). A mobile robot can include sensors for sensing the location of the mobile robot (e.g., global positioning systems and navigation systems). A mobile robot can include communication modules for exchanging communication (e.g., sensor data) with other vehicles, mobile robots, etc., including vehicle-to-vehicle (V2V) communication and vehicle-to-infrastructure (V2X) communication systems.

When a mobile robot determines that a predicted movement intent of another object (e.g., a vehicle, another mobile robot, a pedestrian, etc.) may potentially cause an unsafe and/dangerous situation, the mobile robot can adjust the configuration to address the predicted movement intent. For example, the mobile robot can slow down, speed up, turn, change lanes, warn occupants, etc., to avoid potentially unsafe and/or dangerous situations.

FIG. 1 illustrates an example block diagram of a computing device 100. The computing device 100 can be used to perform various procedures, such as those discussed herein. The computing device 100 can function as a server, a client, or any other computing entity. The computing device 100 can perform various communication and data transfer functions as described herein and can execute one or more application programs, such as the application programs described herein. The computing device 100 can be any of a wide variety of computing devices, such as a mobile telephone or other mobile device, a desktop computer, a notebook computer, a server computer, a handheld computer, a tablet computer and the like.

The computing device 100 includes one or more processor(s) 102, one or more memory device(s) 104, one or more interface(s) 106, one or more mass storage device(s) 108, one or more input/output (I/O) device(s) 110, and a display device 130 all of which are coupled to a bus 112. The processor(s) 102 include one or more processors or controllers that execute instructions stored in the memory device(s) 104 and/or the mass storage device(s) 108. The processor(s) 102 may also include various types of computer storage media, such as cache memory.

The memory device(s) 104 include various computer storage media, such as volatile memory (e.g., random access memory (RAM) 114) and/or non-volatile memory (e.g., read-only memory (ROM) 116). The memory device(s) 104 may also include rewritable ROM, such as flash memory.

The mass storage device(s) 108 include various computer storage media, such as magnetic tapes, magnetic disks, optical disks, solid state memory (e.g., flash memory), and so forth. As depicted in FIG. 1, a particular mass storage device is a hard disk drive 124. Various drives may also be included in the mass storage device(s) 108 to enable reading from and/or writing to the various computer-readable media. The mass storage device(s) 108 include removable storage 126 and/or non-removable media.

The I/O device(s) 110 include various devices that allow data and/or other information to be input to or retrieved from the computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

The display device 130 includes any type of device capable of displaying information to one or more users of the computing device 100. Examples of the display device 130 include a monitor, a display terminal, a video projection device, and the like.

The interface(s) 106 include various interfaces that allow the computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include the user interface 118 and the peripheral device interface 122.

The bus 112 allows the processor(s) 102, the memory device(s) 104, the interface(s) 106, the mass storage device(s) 108, and the I/O device(s) 110 to communicate with one another, as well as other devices or components coupled to the bus 112. The bus 112 represents one or more of several types of bus structures, such as a system bus, a PCI bus, an IEEE 1394 bus, a USB bus, and so forth.

In this description and the following claims, a vehicle can be a land-based vehicle, such as, for example, a car, a van, a truck, a motorcycle, a bus, etc. A vehicle can include various components, such as, for example, tires, wheels, brakes, throttle, engine, steering wheel, etc., to facilitate operation on roadways. A vehicle can be autonomous and/or human operated.

Figure 2A:
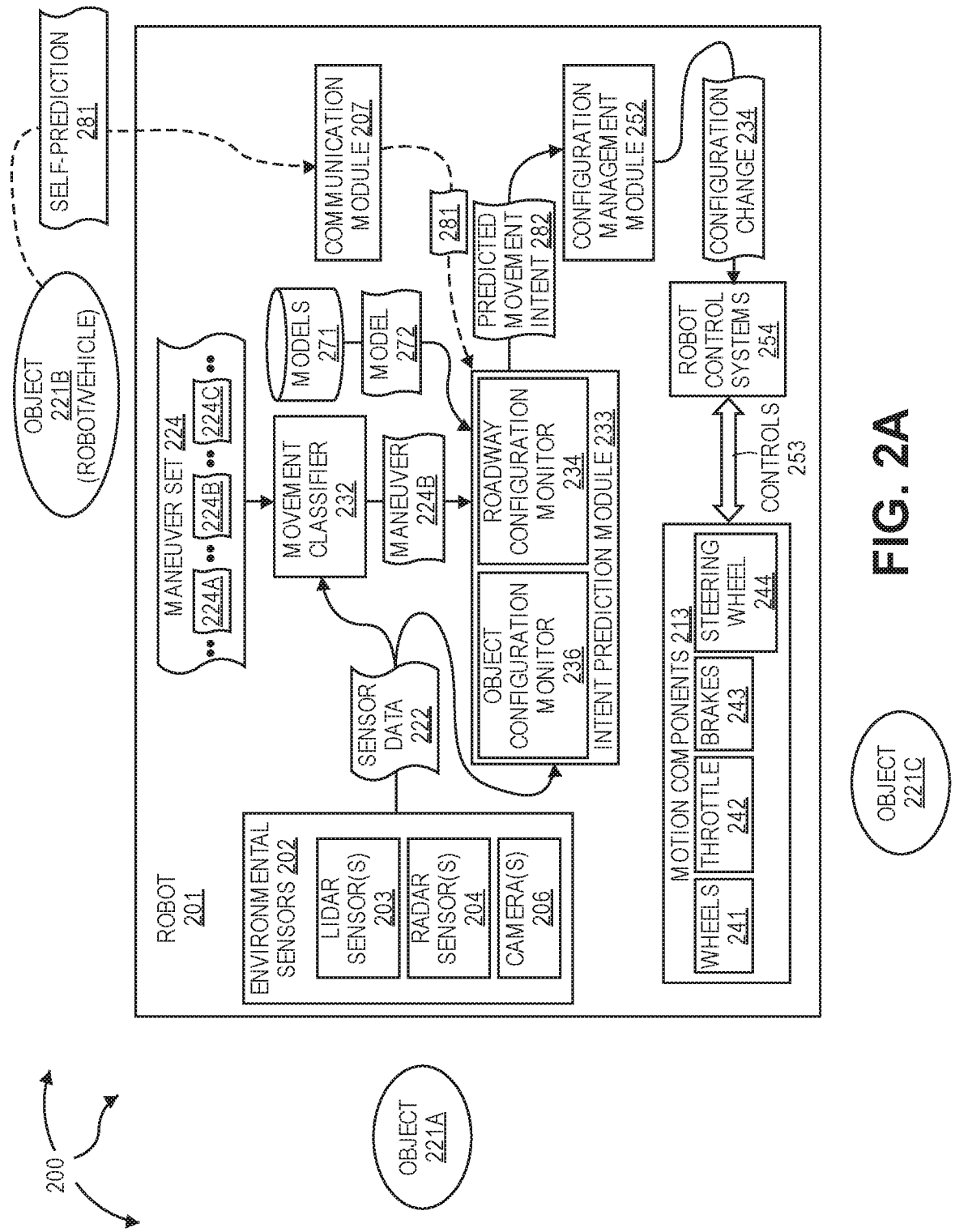
FIGS. 2A and 2B illustrate an example mobile robot that facilitates predicting the movement intent of objects around the mobile robot and self-predicting movement intent.
Figure 2B:
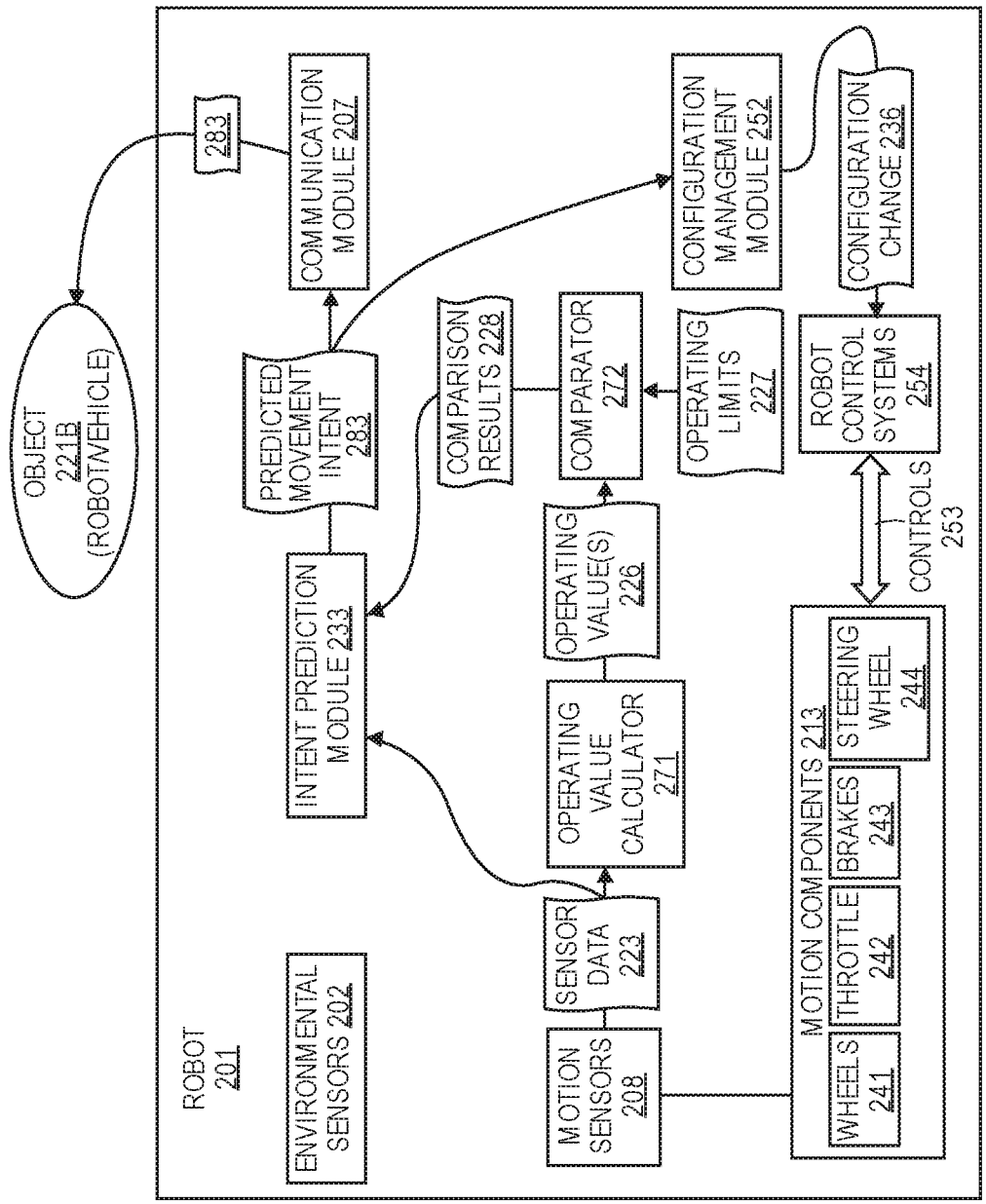

FIGS. 2A and 2B illustrate an example mobile robot 201 in an environment 200. The environment 200 includes the mobile robot 201 and objects 221A, 221B, and 221C. The mobile robot 201 can be a mobile autonomous ground-based robot and can include any of the components described with respect to the computing device 100. In one aspect, the mobile robot 201 is an autonomous vehicle. The mobile robot 201 may carry cargo and/or passengers. Each of the objects 221A, 221B, and 221C can be another mobile object, such as, for example, a pedestrian, a bicyclist, a vehicle, or another mobile robot.

The environment 200 may be and/or may include interconnected portions of a roadway, an intersection, a parking lot, a bike path, a trail, a pedestrian walkway, a cross walk, a sidewalk, a hallway, a corridor, etc. The mobile robot 201 can move within the environment 200 to navigate from an origin to a destination in the environment 200. In one aspect, the environment 200 is a multiple lane highway environment. The mobile robot 201 and the objects 221A, 221B, and 221C can be traveling in the same direction within the multiple lanes.

As depicted in FIGS. 2A and 2B, the mobile robot 201 includes environmental sensors 202, a communication module 207, motion sensors 208, motion components 213, a movement classifier 232, an intent prediction module 233, a configuration management module 252, and robot control systems 254. Each of the environmental sensors 202, the communication module 207, the motion sensors 208, the motion components 213, the movement classifier 232, the intent prediction module 233, the configuration management module 252, and robot control systems 254, as well as their respective components, can be connected to one another over (or be part of) a network, such as, for example, a PAN, an LAN, a WAN, a controller area network (CAN) bus, and even the Internet. Accordingly, each of the environmental sensors 202, the communication module 207, the motion sensors 208, the motion components 213, the movement classifier 232, the intent prediction module 233, the configuration management module 252, and the robot control systems 254, as well as any other connected computer systems and their components, can create message related data and exchange message-related data (e.g., near field communication (NFC) payloads, Bluetooth packets, Internet Protocol (IP) datagrams and other higher layer protocols that utilize IP datagrams, such as Transmission Control Protocol (TCP), Hypertext Transfer Protocol (HTTP), Simple Mail Transfer Protocol (SMTP), etc.) over the network.

The environmental sensors 202 further include the camera(s) 206, the Lidar sensor(s) 203, and the radar sensor(s) 204. The camera(s) 206, the Lidar sensor(s) 203, and the radar sensor(s) 204 can capture images of and/or sense other objects (e.g., objects 221A, 221B, and 221C) in the environment 200. The environmental sensors 202 can capture images in different portions of the light spectrum including the visible light spectrum and the infrared (IR) spectrum.

The environmental sensors 202 can be configured to sense objects 360 degrees around the mobile robot 201. The environmental sensors 202 can be configured to face in different directions, such as, for example, in a direction of travel (e.g., front), away from a direction of travel (e.g., rear), and essentially perpendicular to a direction of travel (e.g., each side), to provide 360-degree coverage. In some aspects, a sensor changes orientation based on the movement of the mobile robot 201. For example, if the mobile robot 201 reverses direction, a front facing sensor can become a rear facing sensor and vice versa. If the mobile robot 201 turns, a side facing sensor can become a front facing or a rear facing sensor. The number and configuration of the environmental sensors 202 can be based on sensing ranges and angles of individual sensors as well as a desired precision of navigation (e.g., within the environment 200). Accordingly, the environmental sensors 202 can capture sensor data for part of the environment 200 by sensing the part of the environment 200 (e.g., out to the sensor range of the environmental sensors 202).

The movement classifier 232 is configured to classify the movement of an object based on the sensor data captured at the environmental sensors 202. In one aspect, the movement classifier 232 classifies the movement of an object as a selected maneuver from among a set of maneuvers, such as curve negotiation behavior, zigzag behavior, harsh acceleration/deceleration behavior, tailgating behavior, etc. The movement classifier 232 can send the selected maneuver to the intent prediction module 233.

The models 271 can include a model of each different maneuver classifiable by the movement classifier 232. When a movement classifier classifies movement as a selected maneuver, a model for the selected maneuver can be sent from the models 271 to the intent prediction module 233.

As depicted, the intent prediction module 233 includes an object configuration monitor 236 and a roadway configuration monitor 234. The intent prediction module 233 can receive a selected maneuver from the movement classifier 232 and the corresponding model from the models 271. In another aspect, the intent prediction module 233 includes a model for each different maneuver classifiable by movement classifier 232. Based on the received selected maneuver, intent prediction module 233 can identify the corresponding appropriate model.

The roadway configuration monitor 234 is configured to monitor the condition of a roadway (or other path) as the mobile robot 201 moves along the roadway (or other path) based on sensor data captured at the environmental sensors 202. The roadway configuration monitor 234 can monitor the direction of travel, the number of lanes, intersections, cross walks, sidewalks, curves, hallways, corridors, etc., based on the sensor data.

The object configuration monitor 236 is configured to monitor the configuration of objects around the mobile robot 201 based on the sensor data captured at the environmental sensors 202.

For a selected maneuver, the intent prediction module 233 can predict the movement intent of an object according to a corresponding model and potentially based on an object configuration and a roadway configuration. The predicted movement intent can be sent to the configuration management module 252. The configuration management module 252 can receive the predicted movement intent of objects. The configuration management module 252 can determine a configuration change for the mobile robot 201 to address the predicted movement intent of other objects (e.g., to avoid a collision or other unsafe situations). The configuration management module 252 can send a configuration change to the robot control systems 254.

In general, the robot control systems 254 include an integrated set of control systems for fully autonomous movement of the mobile robot 201. For example, the robot control systems 252 can include a throttle control system to control the throttle 242, a steering system to control the steering wheel 244 and the wheels 241, a collision avoidance system to control the brakes 243, etc. The robot control systems 254 can receive input from other components of the mobile robot 201 (including the configuration management module 252). Based on received input, the robot control systems 254 can send the automated controls 253 to the motion components 213 to control the movement of the mobile robot 201. For example, the motion components 213 can send the automated controls 253 to cause the mobile robot 201 to brake, slow down, accelerate, turn, etc., in order to avoid a collision or other unsafe roadway situation.

The communication module 207 is configured to communicate with other objects, such as vehicles (e.g., vehicle-to-vehicle communication) or other computer systems (e.g., vehicle-to-infrastructure communication). The communication module 207 can receive movement self-predictions from other objects. The communication module 207 can send the movement self-predictions to the intent prediction module 233. The intent prediction module 233 can consider movement self-predictions of other objects when predicting the movement intent of other objects.

Figure 3:
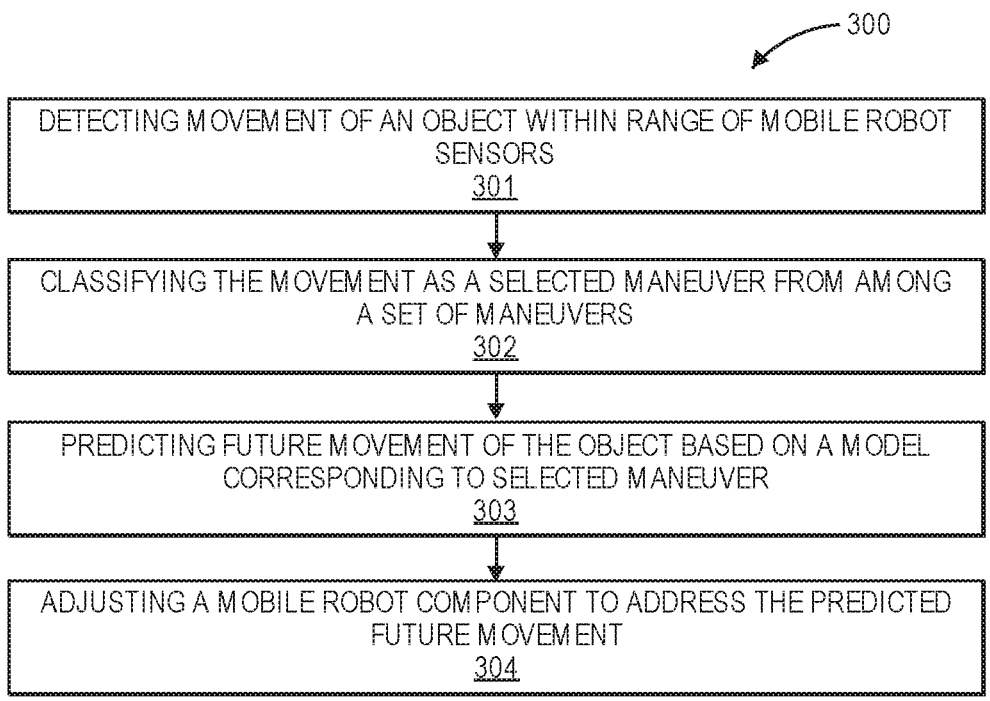
FIG. 3 illustrates a flow chart of an example method for predicting the movement intent of objects around a mobile robot.

FIG. 3 illustrates a flow chart of an example method 300 for predicting the movement intent of objects around a mobile robot. The method 300 will be described with respect to the components and data in the environment 200.

The method 300 includes detecting the movement of an object within a range of mobile robot sensors (block 301). For example, the environmental sensors 202 can detect the movement of object 221A. The environmental sensors 202 can capture the detected movement in the sensor data 222. The environmental sensors 202 can send the sensor data 222 to the movement classifier 232 and the intent prediction module 233.

The object configuration monitor 236 can monitor the configuration of object 221A from the sensor data 222. The roadway configuration monitor 234 can monitor the configuration of the environment 200 (e.g., a roadway (or other path) where the mobile robot 201 is traveling) from the sensor data 222.

The method 300 includes classifying the movement as a selected maneuver from among a set of maneuvers (block 302). For example, the movement classifier 232 can detect the movement of object 221A from the sensor data 222. The maneuver set 224 includes maneuvers 224A, 224B, 224C, etc. The movement classifier 232 can refer to the maneuver set 224 to classify the movement of object 221A as a selected maneuver from among the maneuvers 224A, 224B, 224C, etc. For example, based on the sensor data 222, the movement classifier 232 can classify the movement of object 221 as the maneuver 224B (e.g., one of curve negotiation, zigzagging, hard acceleration/declaration, tailgating, etc.) The movement classifier 232 sends the maneuver 224B to the intent prediction module 233.

The method 300 includes predicting the future movement of the object based on a model corresponding to the selected maneuver (block 303). For example, models 271 can include a model corresponding to each maneuver in the maneuver set 224, including model 272 corresponding to the maneuver 224B. The intent prediction module 233 can access the model 272 from the models 271. The intent prediction module 233 can formulate the predicted movement intent 282 of the object 221A based on the model 272. When appropriate, the intent prediction module 233 can also consider one or more of the sensor data 222, the configuration of object 221A, or the configuration of the roadway (or other path) where the mobile robot 201 is traveling when formulating the predicted movement intent 282.

In another aspect, the object 221B (another robot/vehicle) sends self-prediction 281 to the mobile robot 201 using V2V communication. The communication module 207 can receive self-prediction 281 from the object 221B and forward self-prediction 281 to the intent prediction module 233. The intent prediction module 233 can formulate a further predicted movement intent for the object 221B based on self-prediction 281. Alternately and/or in combination, the intent prediction module 233 can consider any impact of self-prediction 281 on the predicted movement intent 282 and adjust accordingly.

The intent prediction module 233 can send predicted movement intent 282 to the configuration management module 252. The configuration management module 252 can receive the predicted movement intent 282 from the intent prediction module 233.

The method 300 includes adjusting a mobile robot component to address the predicted future movement (block 304). For example, the configuration management module 252 can formulate the configuration change 234 from the predicted movement intent 282. The configuration management module 252 can send the configuration change 234 to the robot control systems 254. The robot control systems 254 can translate the configuration change 234 into the controls 253. The controls 253 can adjust one or more of the steering wheel 244, the wheels 241, the throttle 242, or the brakes 243 to address the predicted movement intent 282 of the object 221A. For example, the controls 253 can adjust motion components 213 to speed up the mobile robot 201, slow down the mobile robot 201, turn the mobile robot 201, etc., to avoid a collision with the object 221A or avoid another unsafe situation based on the predicted movement intent 282 of the object 221A.

Turning to FIG. 2B, the motion sensors 208 can monitor the motion components 213 during the movement of the mobile robot 201. The motion sensors 208 can collect sensor data from monitoring the motion components 213. The motion sensors 208 can send sensor data to the operating value calculator 271 and to the intent prediction module 233. The operating value calculator 271 can receive the sensor data from the motion sensors 208. The operating value calculator 271 can calculate an operating value representing operation of one or more of the motion components 213.

The operating value calculator 271 can send the operating value to the comparator 272. The comparator 272 can receive the operating value from the operating value calculator 271. The comparator 272 can access the mobile robot 201's operating limits for one or more of the motion components 213. The comparator 272 can compare the operating value to the operating limits and send the results of the comparison to the intent prediction module 233. The intent prediction module 233 predicts the movement intent of the mobile robot 201 from the sensor data and the comparison results. For example, if the comparison results indicate that the mobile robot 201 is exceeding one or more operating limits of the motion components 213, the intent prediction module 233 can predict possibly dangerous or unsafe movement by the mobile robot 201.

The communication module 207 can communicate the predicted movement intent of the mobile robot 201 to other robots/vehicles (e.g., using V2V and/or V2I communication). The other robots/vehicles can take appropriate measures to address any predicted dangerous or unsafe movement by the mobile robot 201.

The configuration management module 252 can also implement a configuration change to address any predicted dangerous or unsafe movement by the mobile robot 201. For example, the configuration management module 252 can implement a configuration change to transition operation of one or more of the motion components 213 to (or at least closer to) the operating limits.

Figure 4:
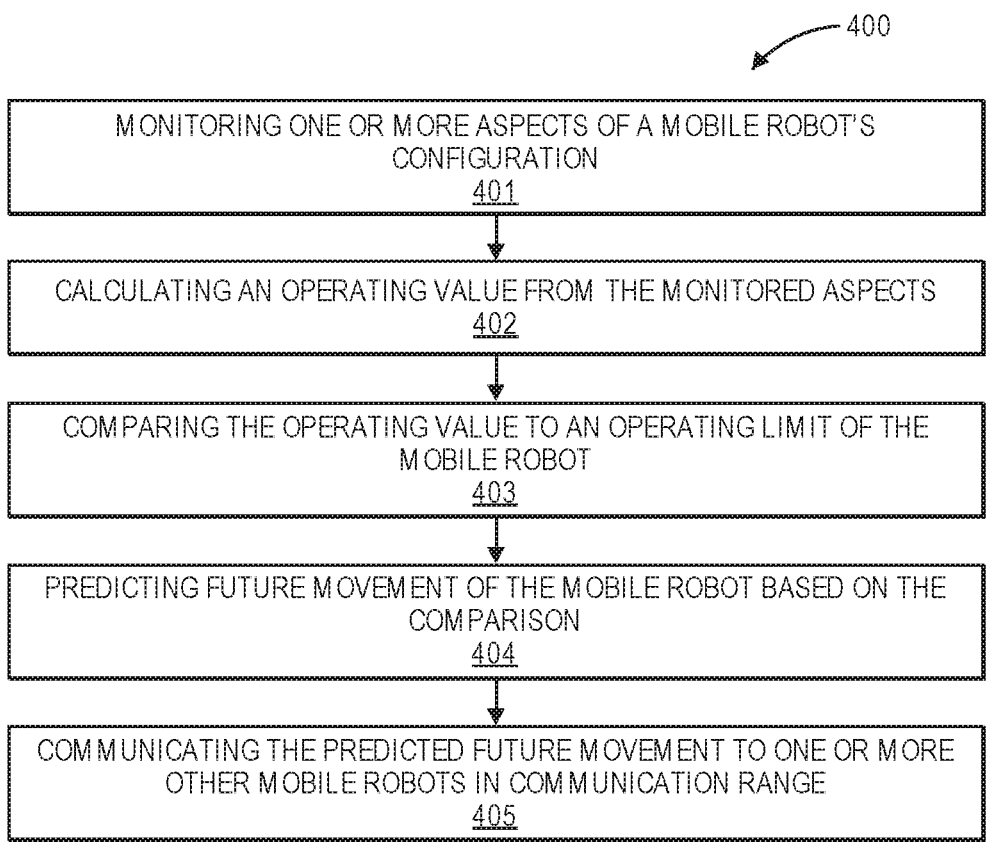
FIG. 4 illustrates a flow chart of an example method for self-predicting the movement intent of a mobile robot.

FIG. 4 illustrates a flow chart of an example method 400 for predicting the movement intent of a mobile robot. The method 400 will be described with respect to the components and data in the environment 200.

The method 400 includes monitoring one or more aspects of the mobile robot's configuration (block 401). For example, motion sensors 208 can monitor one or more aspects of the motion components 213, including the wheels 241, the throttle 242, the brakes 243, and the steering wheel 244. The motion sensors 208 can collect the sensor data 223. The motion sensors 208 can send the sensor data 223 to the operating value calculator 271 and to the intent prediction module 233.

The method 400 includes calculating an operating value from the monitored aspects (block 402). For example, the operating value calculator 271 can calculate the operating value(s) 226 from the sensor data 223. The operating value calculator 271 can send the operating value(s) 226 to the comparator 272. The comparator 272 can receive the operating value(s) 226 from the operating value calculator 271. The comparator 272 can also access the operating limits 227 defining one or more operating limits of the motion components 213.

The method 400 includes comparing the operating value to an operating limit of the mobile robot (block 403). For example, the comparator 272 can compare the operating value(s) 226 to the operating limits 227. Comparator 272 can generate comparison results 228 indicating results of the comparison. The comparator 227 can send the comparison results 228 to the intent prediction module 233. The intent prediction module 233 can receive the comparison results 228 from the comparator 272. The comparison results 228 can indicate whether or not the operating value(s) 226 exceed any operating limits 227.

The method 400 includes predicting the future movement of the mobile robot based on the comparison (block 404). For example, the intent prediction module 233 can formulate the predicted movement intent 283 of the mobile robot 201 based on the comparison results 228 (and possibly also considering the sensor data 223). The intent prediction module 233 can send the predicted movement intent 283 to the communication module 207. The communication module 207 can receive the predicted movement intent 283 from the intent prediction module 233.

The method 400 includes communicating the predicted future movement to one or more other mobile robots in communication range (block 405). For example, the communication module 207 can communicate the predicted movement intent 283 (e.g., via V2V communication) to the object 221B (robot/vehicle). The object 221B can take appropriate measures to address any predicted dangerous or unsafe movement by the mobile robot 201.

Self-predicting movement intent can be determined using any of a variety of mechanisms including handling limit-based mechanisms and control input-based mechanisms.

In one aspect, vehicle maneuvers, including accelerating and cornering, have associated tire/wheel forces generated by slips (e.g., monitored by the motion sensors 208). The tire/wheel forces can define relative motion between the tires and the ground. If the tire slip values (e.g., operating value(s)) become greater than the limit of adhesion between the tires and the ground (a handling (operating) limit), the tires lose adhesion and start sliding. The adhesion limit can be used to predict the movement intent of mobile robots, such as skidding, oversteering, understeering, and fishtailing.

Figure 11:
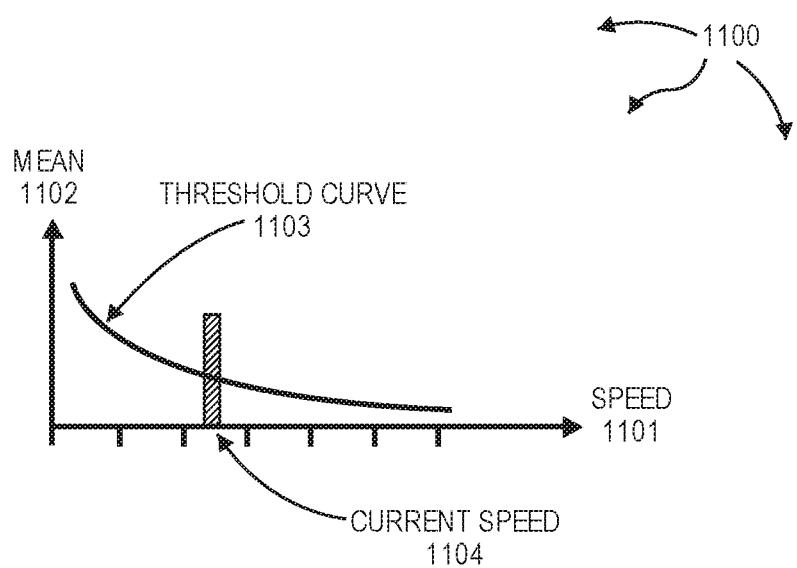
FIG. 11 illustrates an example threshold curve graph of mean inputs relative to speed

In another aspect, control inputs (e.g., steering angles, braking pressure, and throttle position) are used. Control input-based values can be characterized using a threshold curve based on vehicle speed. FIG. 11 illustrates a threshold curve graph 1100 of mean inputs relative to speed. As depicted, the graph 1100 defines the threshold curve 1103 for mean inputs 1102 relative to speed 1101. The mean inputs 1102 under the threshold curve 1103 for speed 1101 indicate probable safe operation. On the other hand, the mean inputs 1102 over the threshold curve 1103 for speed 1101 indicate possible unsafe operation. For example, indicated by the shaded area, the mean inputs 1102 exceed the threshold curve 1103 at a current speed 1104 for a set of inputs.

In addition, the time-derivative values of the control inputs can also be used for characterization of driving style. A smoothing technique can be applied to control input data before taking time-derivative values. The smoothing technique can mitigate the possibility of huge values due to outliers in the control input data. The smoothing technique can be implemented based on an M-estimator using the Huber function and sliding window least squares.

The mean values of both the control input data and a time-derivative of the control input can be calculated. The mean values can be calculated using the stored control input values or a recursive least square technique with a forgetting factor. Mean values can be compared with the speed-dependent thresholds (as depicted in FIG. 11) to compute an Attentive Driving Index (ADI), for example, the ratio of the mean value to the threshold.

Roadway Environment

Figure 5:
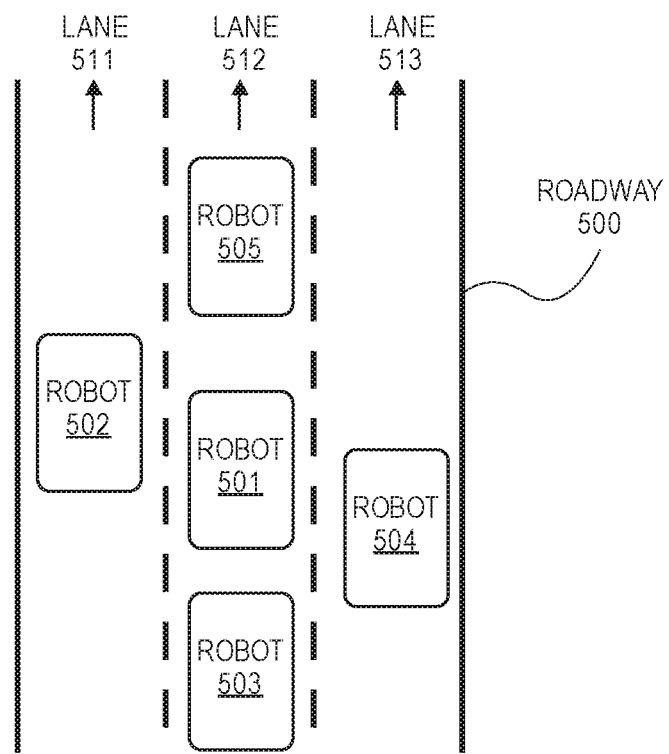
FIG. 5 illustrates an example of mobile robots on a roadway.

FIG. 5 illustrates an example of mobile robots 501, 502, 503, 504, and 505 on a roadway 500. The robot 502 is traveling in lane 511, the robots 501, 503, and 505 are traveling in lane 512, and the robot 504 is traveling in lane 513. In one aspect, the robot 501 performs activities similar to the robot 201 to predict the movement intent of one or more of the surrounding robots 502, 503, 504, or 505.

Curve Negotiation Model

Figure 6:
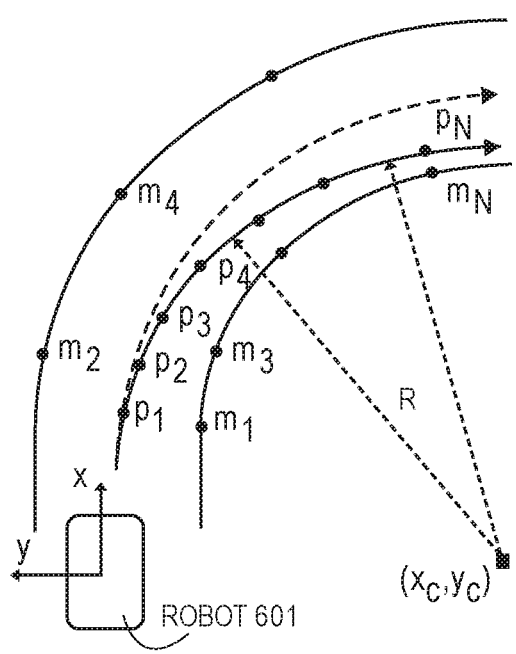
FIG. 6 illustrates an example of a mobile robot negotiating a curve.

The models 271 can store a curve negotiation model. FIG. 6 illustrates an example of a mobile robot 601 negotiating a curve. FIG. 7 illustrates example equations 701A-704 for modeling the predicted movement intent of the mobile robot 601 negotiating the curve.

Mobile robots and human-driven vehicles can try to follow a path minimizing inertial force, i.e., centrifugal force, while traveling on curved roads. However, mobile robots and human-driven vehicles may not want to follow the optimal path on curved roads for a variety of reasons, including cutting into a next path. Therefore, the movement intent of surrounding robots/vehicles (e.g., the robots 502 or 504) can be predicted to determine whether or not they cut into the host robot's path (e.g., the path of robot 501) during curve negotiation.

A mobile robot can utilize the lateral acceleration of surrounding robots to monitor the curve negotiation. To evaluate the lateral acceleration of the surrounding robots, reference lateral accelerations can be determined. The referenced lateral acceleration is determined from the road curvature radius and speed limit. Road curvatures can be provided by sensors (e.g., the environmental sensors 202) or vehicle-to-infrastructure communication. For example, the cameras 206 looking ahead can provide road curvature as a cubic polynomial equation after image processing. Based on the curvature information and lane width, the curved lane is reconstructed as the points $\{M\}_{i=1}^{N}$ in FIG. 6.

The dashed-dotted line represents the center line of the reconstructed lane. The reference path (minimizing centrifugal force) can be determined by finding a circular path with maximum radius R. The reference path can be formulated as an optimization problem in equations 701A and 701B where $(x_c, y_c)$ is the center of the circular path, the point $p_1$ lies on the circular path with radius r, and $\{\beta_i\}_{i=1}^{2}$ are weights. Note that the radius R is not fixed and can change as the mobile robot 601 travels a curved road (the curvature of a road can be designed to gradually increase and decrease).

Then, the threshold lateral acceleration $\bar{a}_y$ is determined using the reference path radius R and the pre-defined speed limit $\bar{v}_x$ in equation 702 where $\rho$ is the reference road curvature defined as $\rho=1/R$. In other words, the lateral acceleration limit $\bar{a}_y$ is a function of the speed limit $\bar{v}_x$ and the time-varying reference road curvature estimate $\rho$.

The lateral acceleration values of the surrounding robots can be obtained by the vehicle-to-vehicle communication or radars. Then, an Attentive Driving Index (ADI) is calculated as defined in equation 703 where $a_{y\_i}$ is the lateral acceleration of the $i^{th}$ robot in FIG. 5.

As an alternative approach, the intent can also be predicted using the radius of the path in which the $i^{th}$ robot travels, instead of using the lateral acceleration. The path radius for which the $i^{th}$ robot travels can be computed as defined in equation 704 where $y_{x\_i}$ and $\dot{\psi}_i$ are the speed and yaw rate of the $i^{th}$ robot, respectively. Then, the ADI can also be calculated with the radius $R_i$ in equation 704 and the reference path radius R in equations 701A and 701B.

Zigzagging Model

The models 271 can store a zigzagging behavior model. FIG. 8 illustrates example equations 801-803 for modeling the predicted movement intent of a mobile robot that is zigzagging.

Zigzag driving can be captured by monitoring the displacement from a certain position of a lane. If robots want to change paths or cut into another robot's path, they swerve to the left and right from their usual positions within the lanes. Therefore, if a surrounding robot (e.g., robot 502 or 504) shows a large variance of displacement from a reference position within a lane, it is judged to have intended a path change.

For example, the lateral displacement $d_{err\_i}$ from a lane marking (reference position) can be computed from equation 801 where $i \in \{1, 2, 3, 4\}$ indicates the $i^{th}$ robot in FIG. 5 and $m \in \{L, R\}$ indicates either left or right lane. The lateral distance $d_i$ between the robot 501 and the $i^{th}$ robot (robot 502 or robot 504) is measured by, for example, the radar sensors 204. The lateral distance $d_m$ between the robot 501 and the lane m is obtained by, for example, the cameras 206 with an image-processing module. A prediction algorithm (e.g., the intent prediction module 233) monitors the variance value of $d_{err\_i}$.

The ADI associated with $d_{err\_i}$ is calculated as defined in equation 802 where $\bar{S}$ indicates the pre-defined threshold. The threshold $\bar{S}$ defined in equation 803 can be considered a function of a speed $v_{x\_i}$ of the $i^{th}$ robot, a tire-road friction coefficient $\mu$, traffic density, and parameters, such as mass and yaw moment of inertia, of the $i^{th}$ robot.

Harsh Acceleration/Deceleration Model

The models 271 can store a harsh acceleration/deceleration behavioral model. FIG. 9 illustrates example equations 901-905 for modeling the predicted movement intent of a mobile robot exhibiting harsh acceleration and harsh braking behavior.

The relative longitudinal distance $d_{rel\_i}$ between the $i^{th}$ robot/vehicle and its preceding robot/vehicle is measured by, e.g., radar sensors 204 or vehicle-to-vehicle communication. Then, the $i^{th}$ robot (e.g., robot 505) dynamics relative to the preceding robot (e.g., robot 501) is represented as a state-space model of a double integrator as defined in equations 901 and 902, where x in equation 901 represents the state vector, ẋ represents the dynamics of x, and $\bar{a}_{rel\_i}$ in equation 902 is the relative acceleration.

Acceleration and braking depends on the distance from the preceding robot. Therefore, reference longitudinal accelerations are determined by the desired distance $d_{des\_i}$ between the $i^{th}$ robot and its preceding robot. The distance $d_{des\_i}$ is a function of the velocity $v_{x\_i}$. For example, in equation 903 τ indicates the time-gap and c indicates a constant. In order to maintain $d_{des\_i}$ as the reference relative distance, the input $\bar{a}_{rel\_i}$ is defined as a reference tracking-state feedback controller in equation 904, where the gain K is determined by a pole assignment technique based on desired transient dynamic responses for acceleration and braking, respectively. In other words, the desired dynamic responses for acceleration and braking produce different input $\bar{a}_{rel\_i}$ values, respectively, and they can be used as reference longitudinal accelerations to monitor driving styles.

The ADI associated with the relative longitudinal acceleration $a_{x,rel\_i}$ of the $i^{th}$ robot is defined in equation 905, where $a_{x,rel\_i}$ is measured by, e.g., radars 204.

Tailgating Model

The models 271 can store a harsh acceleration/deceleration behavioral model. FIG. 10 illustrates example equations 1001 and 1002 for modeling the predicted movement intent of a mobile robot exhibiting tailgating behavior (e.g., robot 503).

The difference between the desired distance $d_{des\_i}$ and the relative distance $d_{rel\_i}$ is computed as defined in equation 1001. Referring back to FIG. 9, the desired distance $d_{des\_i}$ is determined as a function of the speed $v_{x\_i}$, as defined in equation 903.

The variance of $d_{err\_i}$ may be updated if $d_{err\_i}>0$ since the distance error $d_{err\_i}$ less than zero represents a driver maintaining a longer distance than the desired distance. The ADI associated with $d_{des\_i}$ is computed as defined in equation 1002. Threshold $\bar{S}$ (e.g., defined in equation 803) can be considered a function of a speed $v_{x\_i}$ of the $i^{th}$ robot, a tire-road friction coefficient μ, traffic density, and parameters, such as mass and yaw moment of inertia, of the $i^{th}$ robot (e.g., robot 503).

Pedestrian Movement Intent Prediction

Aspects of the disclosure can also be used to predict the movement intent of pedestrians. Generally, pedestrian intent prediction includes identifying and tracking pedestrians using mobile robot sensors and feeding those tracks into a pedestrian prediction model. Camera sensor signals can be used to identify pedestrians relative to a mobile robot. Computer vision algorithms can be applied to identify bounding boxes for each pedestrian in camera images.

Lidar sensors can be used to track the location of pedestrians relative to a mobile robot and other landmarks, such as intersections and crosswalks. Past pedestrian trajectory data and landmark proximity can be used to predict the future intentions of pedestrians, such as when and where they will cross at traffic intersections.

FIGS. 12A and 12B illustrates an example of detecting and predicting the movement intent of a pedestrian. As depicted, the mobile robot 1201 uses cameras to facilitate pedestrian 1202 1202 detection (a bounding box). The mobile robot 1201 tracks past trajectory 1203 of the pedestrian 1202 with Lidar. The mobile robot 1201 takes the Lidar measurement 1204. The mobile robot 1201 uses the Lidar measurement 1204 to calculate the predicted trajectory 1205 of the pedestrian 1202.

Movement Intent Prediction System Dataflow

Figure 13:
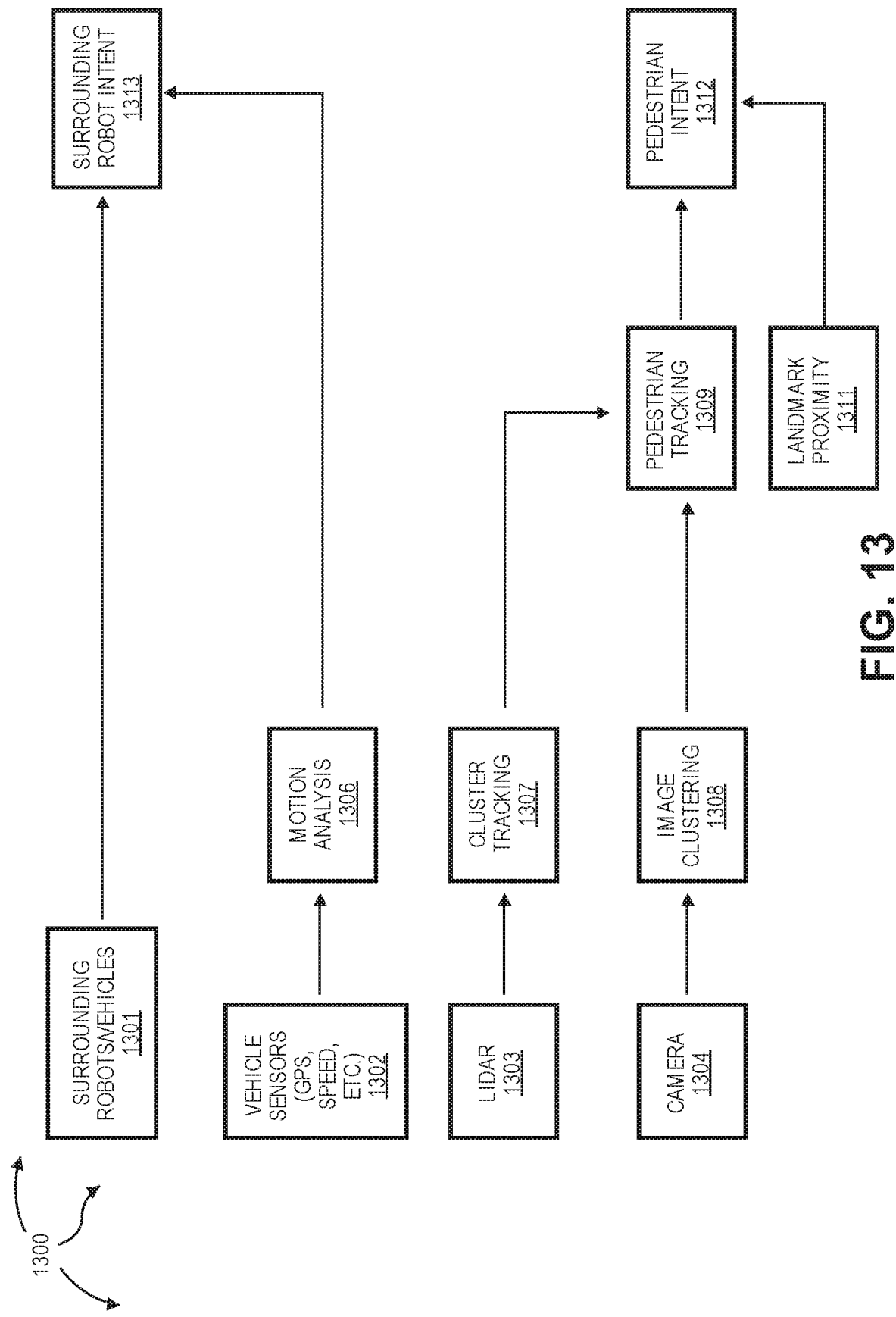
FIG. 13 illustrates an example data flow for a mobile robot detecting surrounding robot and pedestrian intent.

FIG. 13 illustrates an example data flow 1300 for a mobile robot detecting surrounding robot and pedestrian intent. A mobile robot can receive movement intent from surrounding robots/vehicles (block 1301). Sensors at the mobile robot can sense surrounding robots/vehicles (block 1302). The mobile robot can use motion analysis on surrounding robots/vehicles (block 1306). The mobile robot can predict the movement intent of surrounding robots/vehicles (block 1313) from motion analysis and movement intent received from surrounding robots/vehicles.

A mobile robot can user camera (block 1304) and image clustering (block 1308) along with Lidar (block 1303) and clustering tracking (block 1307) to track a pedestrian's past trajectories. The mobile robot can predict pedestrian movement intent (block 1312) from the pedestrian's past trajectories (block 1309) and landmark proximities (block 1311).

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, sensor data, maneuver sets, selected maneuvers, models, predicted movement intents, self-predictions, configuration changes, motion component controls, operating values, operating limits, comparison results, pedestrian detections, observed past trajectories, predicted trajectories, Attentive Driving Indexes, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, sensor data, maneuver sets, selected maneuvers, models, predicted movement intents, self-predictions, configuration changes, motion component controls, operating values, operating limits, comparison results, pedestrian detections, observed past trajectories, predicted trajectories, Attentive Driving Indexes, etc.

In the above disclosure, reference has been made to the accompanying drawings, which form a part hereof, and which illustrate specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, devices, and methods disclosed herein may comprise or utilize a special purpose or general purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including an in-dash or other vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

EXAMPLES

In some instances, the following examples may be implemented together or separately by the systems and methods described herein.

Example 1 may include a method performed by a mobile robot, the method comprising: detecting movement of an object within a range of one or more sensors of the mobile robot; classifying the movement as a selected maneuver from a set of maneuvers; predicting movement of the object based on a model corresponding to the selected maneuver; and adjusting a component of the mobile robot to address the predicted movement.

Example 2 may include the method of example 1 and/or some other example herein, wherein the selected maneuver comprises a curve negotiation maneuver; wherein predicting the movement of the object based on a model corresponding to the selected maneuver comprises predicting that the object intends to cut into the path of the mobile robot based on a curve negotiation maneuver model.

Example 3 may include the method of example 2 and/or some other example herein, further comprising: determining a curvature radius and a width of a roadway lane from sensor data; and determining lateral acceleration of the object from the curvature radius and a speed limit associated with the roadway lane; wherein predicting that the object intends to cut into the path of the mobile robot comprises predicting that the object intends to cut into the path of the mobile robot based on the calculated lateral acceleration and the determined width.

Example 4 may include the method of example 1 and/or some other example herein, wherein the selected maneuver comprises a zigzag maneuver; wherein predicting the movement of the object based on a model corresponding to the selected maneuver comprises predicting that the object intends to cut into the path of the mobile robot based on a zigzag maneuver model.

Example 5 may include the method of example 4 and/or some other example herein, further comprising: monitoring displacement of the object from a reference position of a roadway lane over a period of time; and determining a variance of displacement from the reference position; wherein predicting that the object intends to cut into the path of the mobile robot comprises predicting that the object intends to cut into the path of the mobile robot based on the calculated variance of displacement exceeding a threshold.

Example 6 may include the method of example 5 and/or some other example herein, wherein the threshold is a function of one or more of speed of the object, a tire road friction coefficient of the object, mass of the object, or a yaw moment of inertia of the object.

Example 7 may include the method of example 1 and/or some other example herein, wherein the selected maneuver comprises a change in an acceleration maneuver; wherein predicting the movement of the object based on a model corresponding to the selected maneuver comprises predicting that the object intends to stop abruptly in front of the mobile robot based on a change in an acceleration maneuver model.

Example 8 may include the method of example 7 and/or some other example herein, further comprising: determining a distance between the object and the mobile robot over a period of time; and determining a variance in acceleration of the object based on changes in the measured distance; wherein predicting that the object intends to stop abruptly in front of the mobile robot comprises predicting that the object intends to stop abruptly in front of the mobile robot based on the calculated acceleration variance and a speed of the mobile robot.

Example 9 may include the method of example 8 and/or some other example herein, wherein determining the variance in acceleration of the object comprises determining that the rate of change in one or more of acceleration or deceleration of the object does not continually provide sufficient time for the mobile robot to brake to avoid contact with the object.

Example 10 may include the method of example 1 and/or some other example herein, wherein the selected maneuver comprises a tailgating maneuver; wherein predicting the movement of the object based on a model corresponding to the selected maneuver comprises predicting that the object intends to contact the mobile robot in the rear based on a tailgating maneuver model.

Example 11 may include the method of example 10 and/or some other example herein, further comprising: determining a relative distance between the object and the mobile robot over a time period; and determining that the relative distance is less than a desired distance threshold for at least some part of the time period; wherein predicting that the object intends to contact the mobile robot in the rear comprises predicting that the object intends to contact the mobile robot in the rear based on the relative distance being less than the desired distance threshold.

Example 12 may include the method of example 11 and/or some other example herein, wherein the desired distance threshold is a function of one or more of speed of the object, a tire road friction coefficient of the object, mass of the object, or a yaw moment of inertia of the object.

Example 13 may include a method of self-predicting future movement by a mobile robot, the method comprising: monitoring one or more aspects of a configuration of the mobile robot; determining an operating value from the one or more monitored aspects; comparing the operating value to an operating limit of the mobile robot; predicting movement of the mobile robot based on the comparison; and communicating the predicted movement to one or more other mobile robots in communication range of the mobile robot.

Example 14 may include the method of example 13 and/or some other example herein, wherein monitoring one or more aspects of the configuration of the mobile robot comprises monitoring tire and wheel forces of the mobile robot indicative of relative motion between the tires and the ground; wherein determining an operating value from the monitored aspects comprises determining a tire slip value from the monitored tire and wheel forces; and wherein comparing the operating value to the operating limit of the mobile robot comprises comparing the tire slip value to a handling limit indicative of the limit of adhesion between the tires and the ground.

Example 15 may include the method of example 14 and/or some other example herein, wherein comparing the tire slip value to a handling limit comprises determining that the tire slip value exceeds the handling limit; wherein predicting the movement of the mobile robot comprises predicting that the mobile robot is to skid based on determining that the tire slip value exceeds the handling limit.

Example 16 may include the method of example 13 and/or some other example herein, wherein monitoring one or more aspects of the configuration of the mobile robot comprises monitoring one or more of steering angle, braking pressure, or throttle position.

Example 17 may include the method of example 16 and/or some other example herein, wherein comparing the operating value to the operating limit of the mobile robot comprises comparing mobile robot speed to a speed dependent threshold.

Example 18 may include the method of example 17 and/or some other example herein, wherein predicting the movement of the mobile robot based on the comparison comprises characterizing a driving style of the mobile robot based on the comparison; wherein communicating the predicted movement to one or more other mobile robots comprises communicating the characterized driving style to the one or more other mobile robots.

Example 19 may include a vehicle, comprising: one or more sensors; memory storing computer-executable instructions; and one or more processors coupled to the memory and configured to execute the computer-executable instructions to: detect movement of an object within a range of the vehicle based on sensor data from the one or more sensors; classify the movement as a selected maneuver from among a set of maneuvers; predict an unsafe movement of the object based on a model corresponding to the selected maneuver; and adjust a vehicle component to address the predicted unsafe movement.

Example 20 may include the vehicle of example 19 and/or some other example here, wherein instructions configured to predict the unsafe movement of the object comprise instructions configured to predict an attempt by the object to occupy space already occupied by the vehicle due to one or more of curve negotiation of a roadway lane, lateral movement between roadway lanes, a rate of deceleration in a roadway lane, or following too closely behind the vehicle in a roadway lane.

What is claimed is:

1. A method performed by a mobile robot, the method comprising:
   detecting movement of an object within a range of a sensor of the mobile robot;
   determining, by the sensor, a curvature radius and a width of a roadway lane;
   determining, based on the curvature radius and a speed limit associated with the roadway lane, a reference lateral acceleration of the object;
   receiving, from the object, an actual lateral acceleration of the object;
   determining, based on a comparison between the reference lateral acceleration and the actual lateral acceleration, that the object will cut into a path of the mobile robot; and
   adjusting, based on the determination that the objects intends to cut into the path of the mobile robot, a component of the mobile robot.

2. The method of claim 1, further comprising:
classifying the movement as a selected maneuver from a set of maneuvers, wherein the selected maneuver comprises a zigzag maneuver, wherein predicting the movement of the object based on a model corresponding to the selected maneuver comprises predicting that the object intends to cut into the path of the mobile robot based on a zigzag maneuver model.

3. The method of claim 2, further comprising:
monitoring displacement of the object from a reference position of a roadway lane over a period of time; and
determining a variance of displacement from the reference position, wherein predicting that the object intends to cut into the path of the mobile robot comprises predicting that the object intends to cut into the path of the mobile robot based on the determined variance of displacement exceeding a threshold.

4. The method of claim 3, wherein the threshold is a function of one or more of speed of the object, a tire road friction coefficient of the object, mass of the object, or a yaw moment of inertia of the object.

5. The method of claim 1, further comprising:
classifying the movement as a selected maneuver from a set of maneuvers, wherein the selected maneuver comprises a change in an acceleration maneuver, wherein predicting the movement of the object based on a model corresponding to the selected maneuver comprises predicting that the object intends to stop abruptly in front of the mobile robot based on a change in an acceleration maneuver model.

6. The method of claim 5, further comprising:
determining a measured distance between the object and the mobile robot over a period of time; and
determining a variance in acceleration of the object based on changes in the measured distance, wherein predicting that the object intends to stop abruptly in front of the mobile robot comprises predicting that the object intends to stop abruptly in front of the mobile robot based on the determined acceleration variance and a speed of the mobile robot.

7. The method of claim 6, wherein determining the variance in acceleration of the object comprises determining that a rate of change in one or more of acceleration or deceleration of the object does not continually provide sufficient time for the mobile robot to brake to avoid contact with the object.

8. The method of claim 1, further comprising:
classifying the movement as a selected maneuver from a set of maneuvers, wherein the selected maneuver comprises a tailgating maneuver, wherein predicting the movement of the object based on a model corresponding to the selected maneuver comprises predicting that the object intends to contact mobile robot in a rear portion of the mobile robot based on a tailgating maneuver model.

9. The method of claim 8, further comprising:
determining a relative distance between the object and the mobile robot over a time period; and
determining that the relative distance is less than a desired distance threshold for at least some part of the time period, wherein predicting that the object intends to contact the mobile robot in the rear portion of the mobile robot comprises predicting that the object intends to contact the mobile robot in the rear portion of the mobile robot based on the relative distance being less than the desired distance threshold.

10. The method of claim 9, wherein the desired distance threshold is a function of one or more of speed of the object, a tire road friction coefficient of the object, mass of the object, or a yaw moment of inertia of the object.

* * * * *